United States Patent
Brauman

(10) Patent No.: US 7,467,601 B2
(45) Date of Patent: Dec. 23, 2008

(54) METHOD AND SYSTEM FOR AQUACULTURE PRODUCTION

(76) Inventor: Richard S. Brauman, 770 Boylston St., 5A, Boston, MA (US) 02199

( * ) Notice: Subject to any disclaimer, the term of this patent is extended or adjusted under 35 U.S.C. 154(b) by 496 days.

(21) Appl. No.: 10/537,680

(22) PCT Filed: Jan. 10, 2005

(86) PCT No.: PCT/US2005/000713
§ 371 (c)(1), (2), (4) Date: Jun. 3, 2005

(87) PCT Pub. No.: WO2005/070121
PCT Pub. Date: Aug. 4, 2005

(65) Prior Publication Data
US 2007/0151522 A1 Jul. 5, 2007

Related U.S. Application Data

(60) Provisional application No. 60/535,727, filed on Jan. 9, 2004.

(51) Int. Cl.
*A01K 61/00* (2006.01)
(52) U.S. Cl. .......... 119/228; 119/230; 119/224
(58) Field of Classification Search .......... 119/228, 119/200, 212, 230, 231, 223, 224, 225
See application file for complete search history.

(56) References Cited

U.S. PATENT DOCUMENTS

| | | | | |
|---|---|---|---|---|
| RE30,038 E * | 6/1979 | Sweeney | ............ | 119/212 |
| 4,213,421 A * | 7/1980 | Droese et al. | ............ | 119/224 |
| 4,394,846 A * | 7/1983 | Roels | ............ | 119/212 |
| 4,913,093 A * | 4/1990 | VanGorder | ............ | 119/224 |
| 5,040,486 A * | 8/1991 | Pack | ............ | 119/215 |
| 5,469,810 A * | 11/1995 | Chiang | ............ | 119/248 |
| 5,535,701 A | 7/1996 | Markels, Jr. | ............ | 119/231 |
| 5,799,612 A | 9/1998 | Page | ............ | 119/260 |
| 6,148,769 A * | 11/2000 | Pack | ............ | 119/225 |
| 6,192,833 B1 | 2/2001 | Brune et al. | ............ | 119/204 |
| 6,584,935 B2 * | 7/2003 | Zohar et al. | ............ | 119/204 |
| 6,959,663 B2 * | 11/2005 | Hjaltason et al. | ............ | 119/51.04 |
| 2001/0045189 A1 | 11/2001 | McNeil | ............ | 119/204 |
| 2006/0185609 A1 * | 8/2006 | Sato | ............ | 119/230 |

\* cited by examiner

*Primary Examiner*—Yvonne R. Abbott
(74) *Attorney, Agent, or Firm*—Mark S. Leonardo; Brown Rudnick LLP

(57) ABSTRACT

A system and method provide an intensive aquaculture system for producing caviar or other goods. The system has a photosynthetic subsystem to consume waste from a production species, a food production subsystem to consume the photosynthetic species and be eaten by the production species. Optionally, the food production species may be pelletized or otherwise refined before being consumed by the production species. While each subsystem may have its own water chemistry, gas scrubbers may be used to control gas levels among the subsystems. In one implementation, an enclosure is used with a sensor to measure the gas above the water in the photosynthetic species. Water and species may be transferred among the subsystems as desired. Multiple aquaculture systems may be used in combination to provide age-specific systems operating in conjunction with one another and distribute risk of disease or failure across multiple systems.

20 Claims, 5 Drawing Sheets

METHOD AND SYSTEM FOR AQUACULTURE PRODUCTION

REFERENCE TO RELATED APPLICATIONS

This application claims the benefit of and priority to U.S. Provisional Patent No. 60/535,727, filed Jan. 9, 2004 and entitled Method and System for Aquaculture Production, the contents of which are hereby incorporated by reference.

BACKGROUND

For aquaculture farmers, the ability to locate a farm away from coastal areas enables close proximity to markets, providing benefits in freshness and reduced shipping costs.

Caviar and oyster farms demonstrate that demand exists for locally produced superior goods and that the firms producing these goods can out-compete other producers based on both quality and cost. Caviar farms leverage a technological advantage to produce a very good product, and oyster farms exploit location and resource price to offer higher quality, fresher goods, at competitive prices. Capital-intensive systems in close proximity to markets can provide superior quality, but usually not lower production costs.

A need exists in the aquaculture art to lower production costs. Reduction in production costs can be realized in many ways, such as by a reduction in an amount of food required to be purchased, a reduction in the cost of maintaining acceptable water chemistries, a reduction in the cost of disposal of byproducts, and/or enhanced growth performance of species raised on an aquaculture farm relative to the cost of inputs required for growth.

Another need exists in the industry to elevate the quality of farmed aquatic products to a level comparable with equivalent products from wild caught fisheries. This may be accomplished by feeding cultured organisms the same food they would consume in the wild, or a diet optimized for improvements over wild nutrition. Taste, texture, appearance, health, and nutritional content of farmed organisms can be controlled through the food sources those fish are fed. Much research exists demonstrating the benefits of feeding aquatic organisms the same natural live feed they would eat in the wild, or alternative live feed that enhances certain attributes. Even processed combinations of these natural ingredients in the form of pellets, pastes, flakes, or slurries are thought to be superior to other commercial feeds containing fillers and less costly protein, fat, and carbohydrate sources, or proportions of these nutritional compounds not consumed by aquatic organisms in the wild so as to reduce cost or stabilize food.

SUMMARY OF INVENTION

The aquaculture production method and system of the present invention are intended to address some of the challenges fish farmers face, including how to create an environment that profitably produces an aquatic species of desired quality and quantity. Some implementations of the present invention are directed toward converting system by-products into inputs. For example, nitrogenous wastes can be converted into fertilizer for phytoplankton, and carbon dioxide can be removed from main production systems and added to phytoplankton production systems.

By transforming system by-products into inputs to be used farther along in the production process, potentially storing these inputs, and, if necessary further refining these inputs prior to a monitored and controlled reintroduction, various embodiments of the present invention may reduce production costs, enhance growth and enhance control over production to improve taste, texture, appearance, and nutritional content of harvested goods. Further, fish, shellfish, or mollusks raised in this system for stocking to replenish depleted wild stocks or recreational fisheries will have enhanced health and fitness, and are already in the habit of eating the wild diet they will need to adapt to for survival.

According to one implementation of the invention, an aquaculture apparatus is provided having a photosynthetic culture tank and an enclosure associated with the photosynthetic culture tank to enclose a gas above the contents of the tank. A sensor is also provided for sensing a level of at least one component of the gas.

In another implementation of the invention, the aquaculture apparatus also has a production culture tank. A carbon dioxide stripper is associated with the production culture tank and coupled to the photosynthetic culture tank to supply carbon dioxide stripped from water in the production culture tank to water in the photosynthetic culture tank.

In a further implementation, a trigger signal generator is associated with the photosynthetic culture tank and/or the production culture tank. A water transfer device selectively enables transfer of water between the production culture tank and the photosynthetic culture tank upon receipt of a trigger signal from the trigger signal generator.

In one implementation, a method of aquaculture includes growing a photosynthetic first species in a photosynthetic culture tank and providing the first species to a second species in a food production culture tank that eats the first species. The second species is provided to a fish in a production culture tank. The fish is harvested, and a waste product is provided to a scavenging species in a scavenging species tank.

In a method for producing caviar, a photosynthetic first species also grows in the photosynthetic culture tank. In this method, a gas above water in the photosynthetic culture tank is enclosed, and a level of a gas in the water in the photosynthetic culture tank is monitored by the use of a sensor sensing the gas above the water in the photosynthetic culture tank. The first species is provided to a second species in a food production culture tank that eats the first species. The second species is provided to a fish in a production culture tank, and caviar is harvested from the fish.

In another method for producing caviar a photosynthetic first species is growing in a photosynthetic culture tank. The first species is provided to a second species in a food production culture tank that eats the first species, and the second species is provided to a fish in a production culture tank. Carbon dioxide is stripped from the water in the production culture tank and supplied to water in the photosynthetic culture tank. Also, the caviar is harvested from the fish.

In another method of aquaculture, a photosynthetic first species is growing in a first tank, with the water in the first tank having a first water chemistry. The first species is provided to a second species in a second tank that eats the first species. The water in the second tank has a second water chemistry that is different from the first water chemistry. The second species is provided to a fish in a third tank.

A further method of aquaculture includes growing a photosynthetic first species in a first tank and providing the first species to a second species in a second tank that eats the first species. The second species is processed into pellets, and the pellets are provided to a fish in a third tank.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating aspects of the invention.

DETAILED DESCRIPTION

Figure 1:
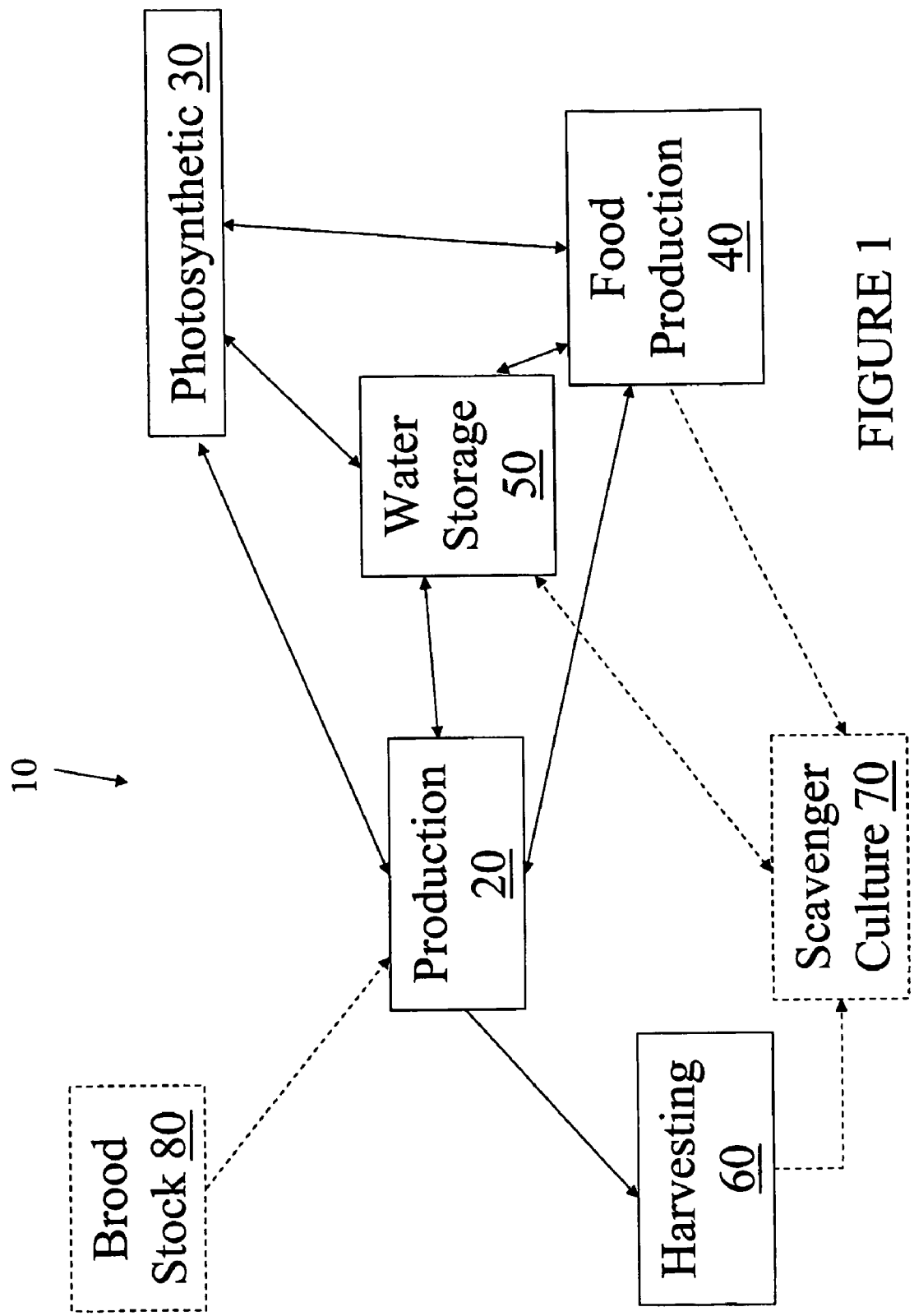
FIG. 1 provides a schematic illustration of an embodiment of an aquaculture production system.

Embodiments of the present invention provide multiple tanks in order to produce feed onsite. By separating major systems like grow-out, consumption of grow-out species waste and production of food for the grow-out species, and by removing and refining system variables like carbon dioxide and live feed before re-introducing them as inputs in other locations within the system, embodiments of the invention seek to recycle nutrients and convert toxic by-products into production inputs, thereby attempting to simulate natural ecosystems. While the physical plant will not precisely duplicate natural conditions, separating subsystems exchanges some aspects of the natural environment for increased product control.

The degree of system intensity, from extensive, to semi-intensive, and finally to intensive, is based on the amount of water used to produce a given mass of aquatic specie and the amount of supplemental feed added to enhance growth rates. Re-circulating refers to systems often indoors in which water is re-used after first filtering in order to remove physical waste and convert toxic dissolved waste by-products into benign forms. Ideally, re-circulating intensive systems eliminate problems outdoor, non-re-circulating farms face under any form of system intensity. These problems include reduced control over final product and water quality, unpredictability and presence of adverse environmental factors, predation, and increased contamination from parasites.

The present invention seeks to maximize the quality of the final product while reducing food costs. Unlike many re-circulating systems, embodiments of this invention often do not seek to minimize the amount of water used. The present invention can, conserve more water than many non-recirculating intensive systems as salmon cage culture, and shrimp and catfish pond culture. Various aspects of the invention may provide reduction of feed costs achieved by producing feed internally, reduction of waste removal and fertilizer input costs by converting waste and by-products into inputs, maximized output and quality achieved by optimizing nutrition and the production environment, and increased controls over product type, taste, quality, and volume achieved by subsystem separation.

Desired aquatic product specifications differ based on the type and intended use. For example, finfish produced for human consumption should meet taste, appearance, and nutritional composition standards, should be free from parasites and not contain undesirable chemicals. Industrial products may need to meet a particular chemical composition or structural standard. Ornamental products may primarily need to meet appearance standards, but implied in that appearance is health of the organism to ensure survival.

Embodiments of the present invention are adaptable to the production of either a single species or multiple species, in fresh, brackish, or saltwater. In order to clearly illustrate the key aspects of the invention, an illustrative embodiment is described for a single species, freshwater finfish farm. However, system parameters are optimized through economies of scale in multi-species, multi-phyla farms. Therefore, other embodiments of multi-phyla farms depict more common uses of this invention. Thus, while the invention is particularly shown and described with references to illustrative embodiments thereof, it will be understood by those skilled in the art that various changes in form and details may be made therein (e.g., surrounding physical plant designs; water quality parameters, and feed species may differ) without departing from the scope of the invention.

In the illustrative embodiment of the invention, a single-species finfish configuration is described. This system may be used to produce most freshwater finfish species. The following example describes a system using comet goldfish as the production species, *Chlorella* and *Chlamydomonas* as phytoplankton, and *daphnia pulex* as the zooplankton. *Moina* and *daphnia magna* may also be used. These species are chosen because their small size and availability facilitates small scale demonstration of the invention. Saltwater facilities might use *artemia* for fry, juveniles, and small fish because brine shrimp are of sufficient size to feed directly to small fish. These saltwater farms may need to culture copepods or other food products large enough for their culture species if those farms elect not to combine food components to produce larger sized food. In the case of sturgeon, one might culture such food sources as crustaceans, mollusks, plants, and finfish commonly found in the wild diet of that sturgeon species.

With reference to FIG. 1, an aquaculture system 10 is illustrated having a production subsystem 20. According to the illustrated embodiment, waste products from the species growing in the production subsystem are provided to the photosynthetic subsystem 30. The photosynthetic subsystem 30 grows a species capable of consuming the waste products from the production subsystem species and is also a food source to the species growing in the food production subsystem 40. The waste products from production may enter the photosynthetic system directly or first pass through filtration systems that change the molecular composition of those waste products. The species growing in the food production subsystem 40 is provided to the production subsystem 20 as food for the species growing in the production subsystem. Each of these subsystems is addressed in further detail below. A water storage device 50 may also be provided for receiving water from a water source and providing water to any of the other subsystems. The water storage device 50 can also receive water from any of the other subsystems and can be used to transfer water between other subsystems. Further, the water storage subsystem may contain several tanks storing or refining bodies of water with different chemistries from each other. A harvesting subsystem 60 may also be provided for harvesting of the species grown in the production subsystem 20. An optional scavenger culture subsystem 70 may also be provided for consumption of waste products from the harvesting subsystem 60 or food production subsystem 40. An optional brood stock subsystem 80 may also be provided to supply brood stock to the production subsystem 20 if needed.

Figure 2:
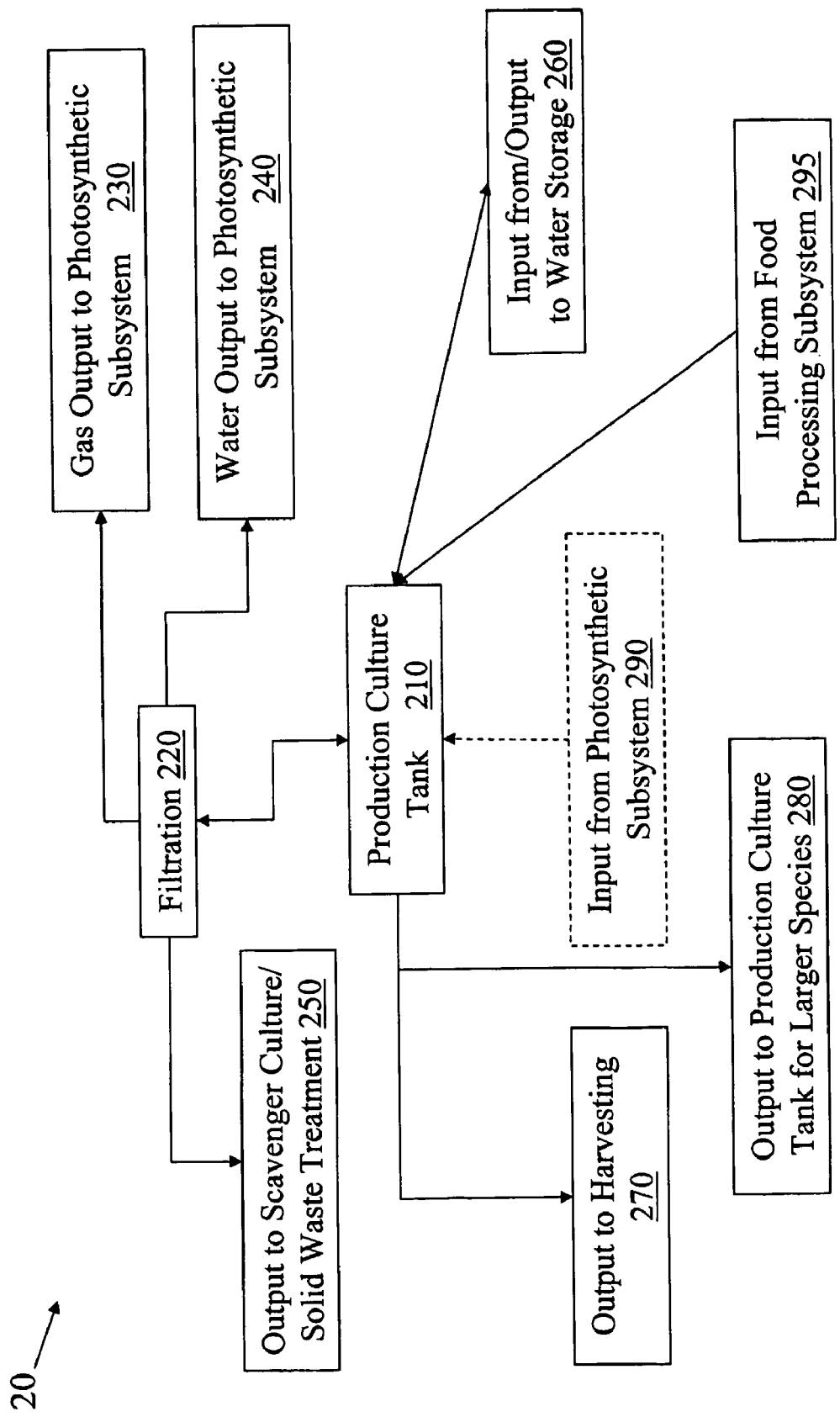
FIG. 2 provides a schematic illustration of an embodiment of a production subsystem according to the embodiment of FIG. 1.

With reference to FIG. 2, the illustrative embodiment of the production subsystem 20 includes a production culture tank 210 for housing water and the species grown in the production subsystem 20. The production subsystem 20 may be used for growing final product species from pre-market to market size. Examples of final product species can include, but are not limited to, the categories of finfish, mollusks, crustacean, algae, and others.

In one example of an implementation of the invention, goldfish are cultured in the production subsystem 20. They may be grown from juvenile to adult, larva to juvenile for sale to other businesses, or any other size and age range to meet the demands of some pre-determined consumer. The production subsystem also includes filtration 220. Filtration may include one or more types of filters in a wide variety of sequences. Examples of filters include, but are not limited to: mechanical filters, biological filters, carbon dioxide strippers and sterilization devices. Examples of sterilization devices can include UV devices, gas injection devices and ozone tubes. Water drawn from the production culture tank 210 can be returned after passing through one or more filters.

Mechanical filtration may occur by a variety of methods. Drum filters, screens, and any other method capable of separating solid waste, uneaten food, and any other physical particles from the culture media (water) may be used.

Biological filters provide a habitat for bacteria capable of reducing ammonia to nitrite and nitrite to nitrate. Bacteria capable of decomposing organic matter may also reside in these filters. The purpose of such filtration is to reduce toxic nitrogenous wastes to non-toxic forms, so that they may be used in subsequent systems as inputs for photosynthetic organisms. A biological filter may resemble a cylinder in which water flows from the bottom through a fluidized bed of sand or other suspended media, to which ammonifying and nitrifying bacteria cling (see e.g., Goldman et al., Fluidized bed reactor and distribution system, U.S. Pat. No. 5,330,652). Similarly, water may trickle down through a mosaic grid, to which these bacteria are attached. The first method uses space more efficiently, but may require supplemental oxygen, and may become dominated by decomposing bacteria. The latter method may require less maintenance and variable inputs, but requires significantly more space to convert the same amount of nitrogenous waste as the former system and may run the risk of difficult to remove physical matter if sufficient mechanical filtration is not present.

Gas-strippers, constructed through simple engineering or through the purchase of more costly devices may be used to separate dissolved gases from the water column. As mentioned earlier, as water trickles vertically down a porous mosaic, lattice structure or other structure that can deflect the water during its descent, horizontal air flow may remove dissolved gas from the liquid, as the two states approach equilibrium concentrations of particular gases. For example, if there is more carbon dioxide in the culture water than there is in the air, the stripping process will increase the carbon dioxide concentration in the air and reduce it in the water. Similar changes will occur for each chemical in either the air that flows through the stripping chamber or those chemicals in the culture water. Higher concentrations will decrease, and lower concentrations will increase compared to the other state as gases approach equilibrium. This may be a non-selective process, so that managers may not easily control how much of a gas is transferred, unless the stripping device is precisely engineered and the air that is used to strip the gas changes based on the dissolved gas level in the culture tank and the desired concentration of gases for the photosynthetic subsystem 30.

The ozone subsystem may consist of pipes holding culture water at sufficient atmospheric pressure to inject ozone into the water. Water purification may be more effective under increased atmospheric pressure because the pressure may aid the dissolution of ozone gas into culture water. The system may link to an information technology subsystem in order to regulate the flow of ozone entering the chamber in order to ensure adequate sterilization of water occurs but also that the level of ozone entering culture tanks does not reach a level toxic to fish. This system, along with other such sterilization methods as exposure to ultra-violet light or irradiation may be used to sterilize water in culture systems, waste-water treatment, food production or other systems.

Ozone tubes may be used as a form of filtration. When ozone is injected into the water column at a specified atmospheric pressure and time, the ozone will oxidize physical matter and chemicals in the water. The International Bottled Water Association exposes water to 1-2 mg/L ozone for 4-10 minutes. Production facilities will have to determine the exposure time and quantity based on their system that provides ozone, intended use, and production facility parameters. Ozone can be more effective than chlorine in destroying bacteria, fungi, and viruses, oxidizing organic and inorganic compounds as well as removal of iron and manganese. This may be useful for destroying parasites, and converting organic waste into carbon dioxide. The most common by-product of the ozone filter may be oxygen, as the ozone approaches a lower level of atmospheric pressure. However, different by-products may be created as ozone interacts with a variety of chemicals dissolved in the water.

A processor-based, information technology subsystem may be provided to monitor and respond to water quality parameters and production levels of the subsystems. The information technology subsystem may coordinate culture tanks, filters, and other systems by linking water probes and sensors with computer systems in order to monitor conditions, collect data, and/or notify controllers or automated input tanks to respond to changes in water quality and production. Probes in tanks may detect oxygen, carbon dioxide, nitrogen compounds (such as $N^2$, ammonia, urea, nitrite and nitrate), temperature, pH, salinity, turbidity, and other system parameters. Information on system parameters may be stored in databases and analyzed, as well as instantly relayed to controllers or to such devices as oxygen or water storage tanks and release valves to optimize culture environments. Maintaining dissolved oxygen levels to ensure the survival and optimal growth of culture species is preferably performed by this subsystem.

The production subsystem 20 can also include a wide variety of inputs and outputs. Various examples are illustrated in FIG. 2. In one implementation, carbon dioxide from an optional carbon dioxide stripper of the filtration 220 may be output 230 to the photosynthetic subsystem 30. Alternatively or in addition, water from the filtration 220 may be output 240 to the photosynthetic subsystem 30. Solid waste from the filtration 220 may be output 250 to the scavenger culture 70 or another solid waste treatment facility.

The purpose of the solid waste treatment facility may be threefold. First, solid waste is eliminated from culture tanks and stored. Once stored, managers, and plant designers may choose to either transport the waste offsite for agricultural fertilizer or other use, as either a cost or revenue. However, managers may also choose to recondition this solid waste to use internally as fertilizer. The degree of reconditioning depends on a variety of factors. One might be to prevent the spread of harmful bacteria and parasites across systems or species. A marketing obstacle may be how managers market a final product that uses fish waste in an unaltered form as an input. However, given this waste is primarily used to grow plants for human consumption, this is less of an issue. The intensity of the system may dictate how finely waste should be processed. In more extensive systems, the added space required to use waste in its unaltered form may be useful, as it provides greater surface area for bacteria cultures that may serve as a food source for the subsequent food production subsystem 40. Refining waste into chemical components and non-useable matter will allow managers to discard the less useful portion and have a source of nitrogenous and phosphorous-based waste that is easier to store and distribute and traditionally expensive to purchase.

The production culture tank 210 of the production subsystem 20 has a variety of inputs and outputs, including an input/output 260 from the water storage device 50. An output 270 is also provided to the harvesting subsystem 60 in order to provide the species grown in the production subsystem 20 to the harvesting subsystem 60. Optionally, the species grown in the production subsystem 20 may be output 280 to a production culture tank located in another production subsystem 20 intended to raise older samples of the species. Such a configuration could allow differently-sized tanks and other parameters specialized for specific age ranges of the species.

Examples of inputs to the production culture tank 210 include an optional, input 290 from the photosynthetic subsystem 30. Such an input 290 could, for example, provide water with the species grown in the photosynthetic subsystem 30 or water that has been filtered by a species grown in the photosynthetic subsystem 30. An example of the former species is algae, while an example of the latter species is a non-floating plant. It is understood that the invention is not limited to these examples. An input 295 is also provided from the food production subsystem 40, to provide the species grown in the food production subsystem 40 as food for the species grown in the production subsystem 20.

Devices for controlling inflow and outflow among components may be provided, along with probes in the culture tank and filtration 220 to measure water quality parameters. As fish grow they may be divided in number and moved into more than one culture tank to increase growth and survival rates by increasing water volume per fish. Fish enter this system as juveniles, which may be purchased from an outside distributor, or raised onsite through a breeding program in a brook stock subsystem 80. The fish are harvested when determined to have met market size.

The culture tank may be of a circular, conical, raceway, doughnut, D-shape or other design. For this example, a circular tank is used. In all cases water flows through the culture tank and is filtered mechanically and biologically. Solid waste may be removed through mechanical filtration and processed in the solid waste-removal subsystem. Much water is initially returned to the production subsystem 20 after biological filtration except for water used to flush solid waste to the waste removal subsystem. The purpose of biological filtration is to convert toxic waste-products such as urea and ammonia to nitrite, and then to nitrate. The processes of ammonification and nitrification reduce toxic nitrogenous compounds to non-toxic forms. However, changes in carbon dioxide and pH levels may revert non-toxic forms back to toxic forms. Therefore, water may be automatically removed from the production subsystem 20 to the photosynthetic subsystem 30 and/or waste removal subsystem should this occur.

Water quality parameters may be monitored within the production subsystem 20 by the information technology subsystem and other methods. The following parameters among others may be monitored: water flow rate, temperature, dissolved oxygen, carbon dioxide, ammonia, nitrite, nitrate, pH, turbidity, ozone, hardness, salinity. For goldfish, these parameters may be optimized at the following levels:

pH=7.4

Total Alkalinity=100 ppm stabilize pH, General Hardness=115 ammonia<0.1 ppm, nitrite<0.2 ppm, nitrate<50 ppm

CO2<1 ppm

DO>8 ppm

Temp=20-22 C copper<0.1 ppm

Salinity: 0.1%-0.3%

Chlorine<0.5 ppm

At any time, water may be added from the water storage device 50 to correct for adverse conditions. Further, the information technology subsystem may be linked to devices capable of correcting water quality parameters, such as low dissolved oxygen. In this case, the information technology subsystem may detect low dissolved oxygen levels in the production subsystem 20 by means of a dissolved oxygen probe, and release oxygen through submerged gas distribution tubes until oxygen levels return to optimal levels.

When the information technology subsystem detects that nitrogenous compounds (dissolved salts and gases) have reached a pre-determined threshold, the water in the production subsystem 20 is released into the photosynthetic subsystem 30. Water levels in the production subsystem 20 may be maintained with water inflows from the water storage device 50.

In this example, water may be filtered mechanically to remove physical particles, biologically to convert nitrogenous by-products to non-toxic forms as well as organic matter into useful carbon-based by-products, ozone treatment to destroy harmful micro-organisms and parasites as well as further break down organic and inorganic compounds, and finally carbon dioxide stripping filtration chambers. Gas stripping filters remove all dissolved gases in excess of the levels found in the air that flow through this filter. The primary purpose is to control carbon dioxide which will continue to accumulate in the culture system as the culture species respires and as wastes are broken down. Carbon dioxide is toxic in excess, but is a key input needed to produce phytoplankton. Therefore, air may flow through the gas stripping chamber of the production subsystem 20 and potentially the food production subsystem 40 and in both cases into the photosynthetic subsystem 30 as an input for photosynthesizing plankton.

Figure 3:
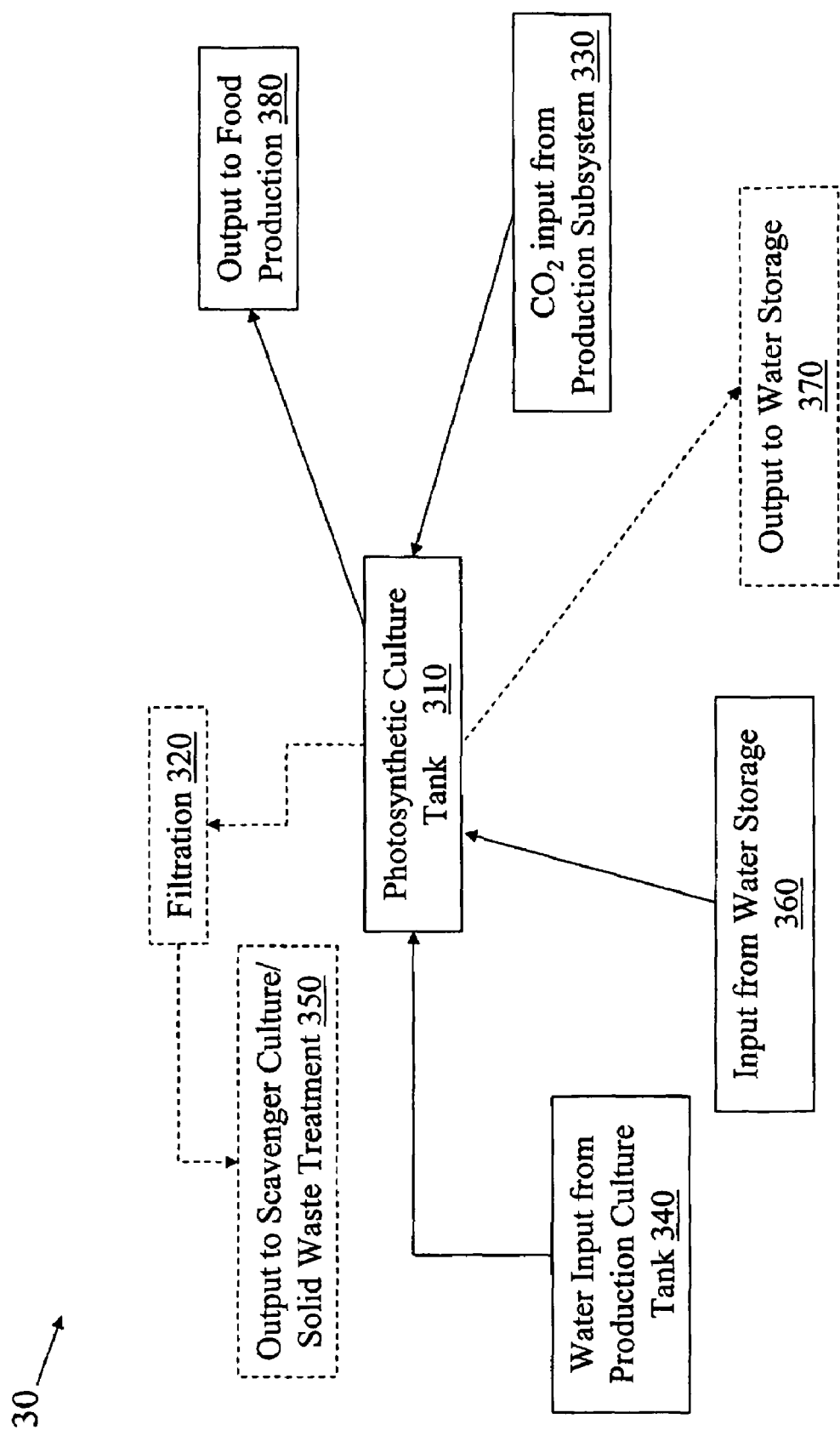
FIG. 3 provides a schematic illustration of an embodiment of a photosynthetic subsystem according to the embodiment of FIG. 1.

With reference to FIG. 3, the photosynthetic subsystem 30 includes a photosynthetic culture tank 310. The photosynthetic culture tank 310 houses water and the species grown in the photosynthetic subsystem 30. The species grown in the photosynthetic subsystem typically synthesize carbohydrates from carbon dioxide and water using light as an energy source and usually produce oxygen.

The photosynthetic subsystem 30 can produce one or more species of algae or diatoms (for D. Pulex: *Chlorella, Chlamydomonas, Scenedesmus*, heterotrophic microflaggelates and bacteria). Algae and diatoms can be selected based on the nutritional requirements and feeding preferences of final product species and zooplankton species. In one example implementation of the invention, *chlorella*, and *chlamydomonas* algal strains are cultured in the photosynthetic subsystem 30.

The photosynthetic subsystem 30 also includes optional filtration 320, which, if provided may be similar to the filtration 220 of the production subsystem 20. However, ozonation or UV sterilization may not be necessary as the process will destroy algae cells. Research suggests ruptured algal cells may inhibit algal growth. Carbon dioxide removal is not necessary as the parameter is a limiting growth factor that should be maximized, not minimized. Depth, flow rate, and agitation may be minimized so that algal cells receive adequate light for photosynthesis but are not damaged. Gas infusion input 330 from production subsystem gas strippers and water inflow input 340 from the production subsystem 20 may provide adequate carbon dioxide, nitrogenous fertilizers, and agitation. Water drawn from the photosynthesis culture tank 310 can be returned after passing through one or more filters.

If filtration 320 is provided, solid waste from the filtration 320 may be output 350 to the scavenger culture 70 or another solid waste treatment facility.

The production culture tank 310 may also have an input 360 from and an optional output 370 to the water storage device 50. An output 380 is also provided to the food production subsystem 60 in order to provide the species grown in the photosynthetic subsystem 30 to the food production subsystem 60.

Supplemental nitrogenous-based, phosphorous-based, and other fertilizers may be added to maximize photosynthetic species growth. Optionally, seeding of photosynthetic species, such as algae, may be performed by use of an optional micro-culture subsystem.

Another subsystem that may require frequent seeding is the food production subsystem 40. Algae, rotifers, and *daphnia* are examples of species maintained in the optional micro-culture system. The subsystem may require precise monitoring of light, temperature, salinity, and other water quality parameters by the information technology subsystem or other method. As micro and larval cultures are frequently more sensitive to changes in water quality, system parameters may need to be held to small ranges. Further, feed inputs may need to be stored to supplement this system regularly. Additional husbandry techniques may need to be employed to ensure culture stock remain in good condition.

Other subsystems may exist to grow larva to a size suitable for stocking in nurseries or production systems, or to breed and hatch broodstock in order to supply systems. The design of these systems may resemble production systems, though nutrition and water quality may need to be adjusted based on species requirements.

The parameters monitored in the photosynthetic subsystem 30 have different objectives than in the production subsystem 20, because nitrogenous compounds and carbon dioxide are now inputs, not toxic by-products. Further, other parameters like pH may vary between subsystems based on parameter levels that optimize growth as noted below. The key parameters that may need to be optimized in this example are levels of carbon dioxide, nitrate, and phosphorous, as well as light intensity throughout the water column. Too much or too little light may destroy or otherwise cause the death of algal cells which can contribute to the population crashing within the culture tank. A population crash is defined as a substantial amount of the culture species perishing, thereby inhibiting future growth under current conditions.

In this example, *chlorella*, and *chlamydomonas* algal strains are cultured, requiring the following conditions:

10,000 lux (full sunlight if dense)

Temp: 10-20 C good growth, 18-22 C typically optimal, match other cultures pH 8.2-8.7 for optimal growth of both, 7-9 for short periods $CO_2$:0.04% in air limiting, supplement in air injected at 0.5-2% filtered with air to 14 m before bubbled into cultures

*chlorella* growth in 300 L tank, >50 million cells/ml after 130 hours 90 g/m^3/day for continuous chemostat One may increase growth in this system by supplements of carbon dioxide, nitrogen, and phosphorous. Transparent facility roofs may provide access to sunlight, but algal cultures may also be exposed to supplemental light sources. While this example may use natural sunlight, others should be tailored to the biological requirements of the algae, culture method, tank depth, and amount of circulation.

The photosynthetic subsystem 30 may consist of one culture tank or more than one, so long as adequate algal cells are available to support the food production subsystem 40. If more than one tank is used, they may be maintained in various stages of algal bloom (population growth cycle) in order to fine-tune the production cycle. These tanks may be arranged vertically to allow water to flow through each tank into the next, with water originating from the production subsystem 20. They may also be arranged horizontally in which water flow from the production subsystem 20 may be diverted into any of the photosynthetic subsystem 30 culture tanks in any order, at any time, at either specified volumes over set intervals or as-needed. Water filtration may occur in this system through biological filter devices, though simple circulation by pump, water inflow, or gas inflow, maybe sufficient. This system may be linked to the water storage device 50 if substantial volumes of water need to be removed from the system. Such instances may occur if the algal population crashes, tanks need to be cleaned or reseeded from stored stocks, or for general maintenance.

Water and suspended algae may flow from the photosynthetic subsystem 30 into the food production subsystem 40. This may occur when algae density in food production culture tanks 410 is low, or the algal population has reached a threshold density that if not reduced may lead to a population crash. The timing of water release from photosynthetic subsystems 30 into food production subsystems 40, as well as inflows from production subsystems 20 into photosynthetic subsystems 30 may be determined by the number of tanks used, the species cultured in production; photosynthetic, and food production subsystems, the growth rates of those species in that particular facility, and changes in the levels of water quality parameters. Hypothetical system proportions and parameters are given for the combinations of culture species following the system descriptions.

The flexibility of this system is a significant benefit of this design, and one that differs substantially from other intensive systems. This flexibility allows managers to modulate flows between systems so that water volumes, flow rates, and nutrient concentrations may be precisely controlled and stored for use in a different system or at a later point in the production time line.

Plant species such as duckweed may be cultured along with or in place of algae if managers wish to feed this directly to the production species, supplement feed pellets, stabilize water filtration, or employ its presence for other benefits. Duckweed and other rapidly growing hardy plants commonly found in the ecosystems of final product species may benefit culture species nutritionally if fed, are easy to culture within intensive systems, and filter nitrogenous waste and other fertilizing system by-products including carbon dioxide from the water.

Experiments have shown the effectiveness of the following ratio of production water volume: phytoplankton water volume: zooplankton water volume →2:1:1. A farm with this ratio may consist of 100×10,000 gal fish tanks, 50×10,000 gal algae tanks, and 100×5,000 gal zooplankton tanks. This is a total volume of 2 million gallons. Some trials produced a ratio of 4:1:1. By dedicating too few food production tanks to too many product tanks this may have reduced culture volume and water requirements at the expense of reduced product growth. While growth rates in most cases were 130% for the invention compared with 200% for traditional systems during the trial periods, much of the slower growth is attributable to turbidity. Because the commercial pellets were more visible than the live feed they were consumed by more fish each feeding period. Had live feed been compressed into larger pellets as the invention suggests, there may have been a growth rate closer to 200%.

These production rates may require daily water flow from the photosynthetic subsystem 30 to the food production subsystem 40. Water levels in photosynthetic subsystems 30 and food production subsystems 40 may be allowed to fluctuate to account for—differences in flow rates between the production subsystem 20, photosynthetic subsystem 30, and food production subsystem 40. This might occur if managers decide not to release water from the production subsystem 20 if sufficient levels of nitrate have not accumulated. These nitrate levels are a function of feed rates, amount of feed consumed, the levels of protein in the feed, rate of nitrification in the biological filter, exposure to air at the tank surface or in the gas stripping chamber, metabolic rates of production species, and other factors. A major benefit of this system is the increased flexibility and control over the complex interaction of these production variables that attributes like subsystem separation, input regulation, and water volume modulation provide.

Figure 4:
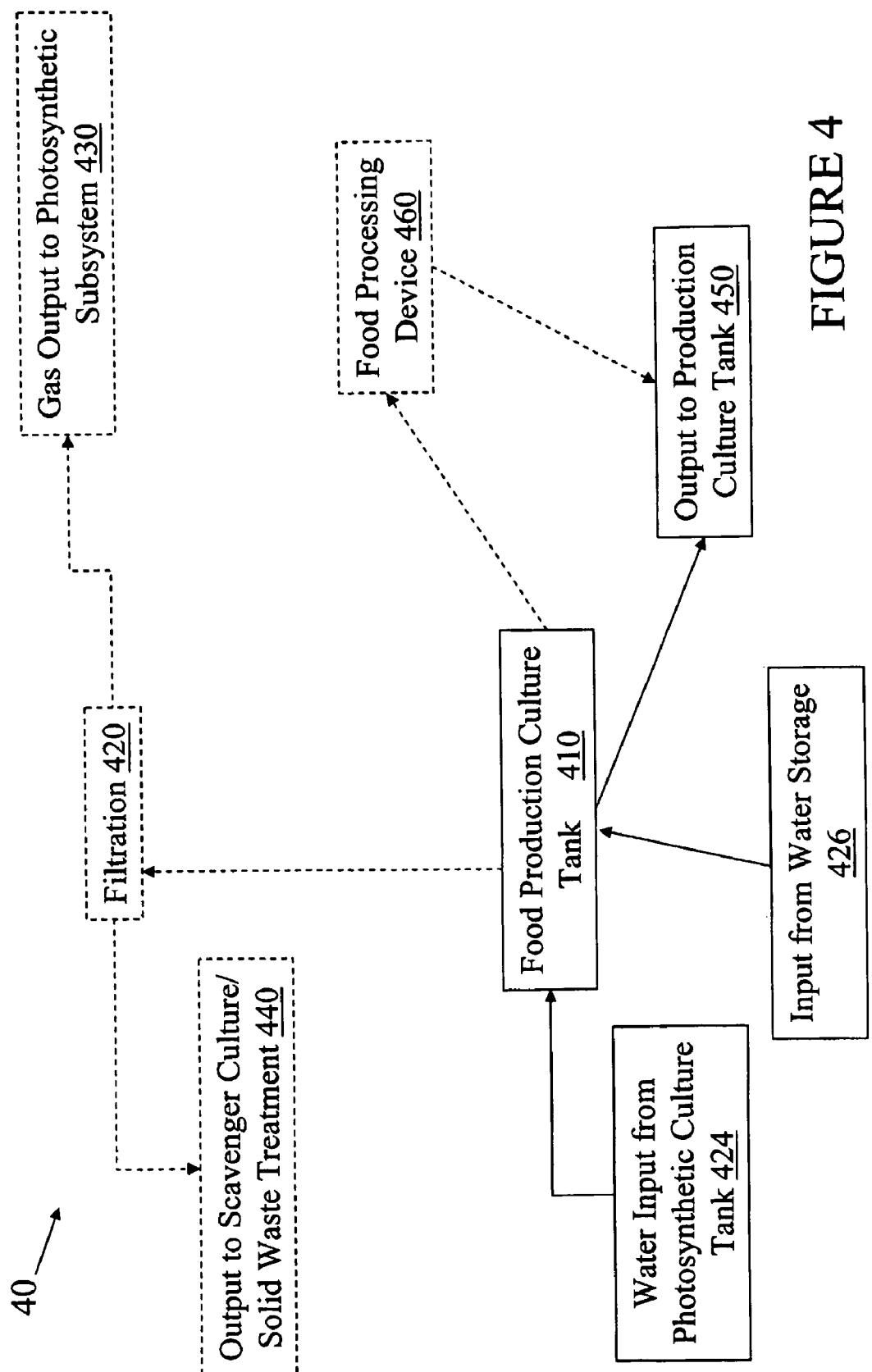
FIG. 4 provides a schematic illustration of an embodiment of a food production subsystem according to the embodiment of FIG. 1.

The food production subsystem 40 is described in relation to FIG. 4. The food production subsystem 40 includes a food production culture tank 410 and optional filtration 420. An input 424 is provided to the food production culture tank 410 for water from the photosynthetic culture tank 310. Another input 426 is also provide from the water storage device 50. The food production subsystem 40 can resemble the production subsystem 20 and photosynthetic subsystem 30 in design, devices, and methods used to culture the species grown. In one implementation, carbon dioxide from an optional carbon dioxide stripper of the filtration 420 may be output 430 to the photosynthetic subsystem 30. Solid waste from the filtration 420 may be output 440 to the scavenger culture 70 or another solid waste treatment facility.

In an example implementation of the invention, the photosynthetic subsystem 30 can grow phytoplankton and the food production subsystem 40 can grow zooplankton. The food production subsystem 40 can produce one or more species of live feed capable of consuming phytoplankton (*moina, daphnia, artemia*, copepods, feeder fish, zebra mussels). Phytoplankton are selected based on nutritional requirements and feeding preferences of final product species, as well as ease of culture, reproductive rate, and growth rate.

Like phytoplankton, zooplankton may grow better under reduced flow rates, so methods of water circulation, filtration, and water and gas inflow can be structured accordingly. For *Daphnia* in this example, water may be gently removed through a 100 μm screen in order to filter biologically, strip carbon dioxide, and oxygenate. Physical waste in the form of expired *daphnia* or *ephippial* egg cases may be removed at harvest, tank draining and cleaning, or other methods. One means of removing such waste through a bottom or top drain is to illuminate the tank away from the drain, which attracts the *daphnia* to the light source, and releasing water through the drain. Artificial illumination may be required for culture if sufficient light intensity does not exist through natural sources that may be accessed through a greenhouse roof on this portion of the physical plant.

In the food production subsystem 40 of this example, the following parameters may be optimized around the following levels:

25° C.

feed: 1 μm bacteria digested & assimilated w/50% efficiency, optimal nannoplanktonic algae esp. flagellates, not blue-greens, heterotrophic microflaggelates (up to paramecium size) excellent addition, detritus and benthic when food scarce, non-selective so high concentration suspended material detrimental to metabolism mass cultivation of *daphnia magna* on no/low-value agro-industrial residues, De Pauw et al., 1981

$10^5$-$10^6$ algal cells/mL ideal, autotrophic increases system oxygen monoxenic or dixenic system of *Chlorella, Chlamydomonas, Scenedesmus* supplement w/vitamin mix: in μg/L: Biotin 5 Thiamine 100, Pyridoxine 100, Pyridoxamine 3, Calcium Panthothenate 250, B 12 (as mannitol) 100, Nicotinic acid 50, Nicotinomide 50, Folic acid 20, Riboflavin 30, Inositol 90, Goulden et al., 19824 add 1 ml of this to each liter of culture water density: 20-100 animals/liter regular photoperiods temp: 15-25 C maximize sodium and chloride, not toxic, control potassium and magnesium b/c toxic above 10 mm and 30-240 pg/L respectively pH 7-8 blooms: 100 g/m$^3$ on cladocerans and manure, harvest 30% standing crop daily

The following or other methods may be used to output 450 the species grown in the food processing subsystem 40 to the production subsystem 20. In the illustrative example of algae and zooplankton, harvesting of the zooplankton species may occur by flowing water through a screen 600μ of sufficient size to only remove smaller members of the population. This may be the desired method if smaller organisms are used to feed live to fry or juvenile production cultures. In this case, the daphnia should not be removed from the water as exposure to gas may create gas pockets between the daphnid body and carapace, which will inhibit swimming and eventually result in death and may be harmful to production species if consumed. In some systems, a more complex method of harvesting may not be necessary, but managers may want to ensure much of the algae suspended in the zooplankton culture tank has been consumed before flowing the zooplankton, water, and any remaining algae into a production culture tank 210. This method of harvesting may not be suitable for feeding to larger fish in production cultures.

Another method more appropriate for feeding fish that desire larger/adult *daphnia* is to submerge a 700 μm screen or similar into the food production culture tank 410, move the screen or allow the *daphnia* to migrate towards a light source, and drain water from the side of the partitioned culture tank that contains the larger *daphnia*. In this case, *daphnia* may be exposed to surface air or gas in the culture environment because adult finfish may be less sensitive to ingesting small amounts of gas through their feed. Similar to the harvest method previously described, the zooplankton, water, and any remaining algae may flow into a production culture tank 210. Managers may want to limit the amount of algae suspended in the food production subsystem 40 before flowing water into the production subsystem 20. If managers are concerned with minimizing the water exchange between subsystems, this method may not be appropriate.

A third example of a method of harvesting, which may be more useful when feeding larger production culture specimens or when nutritional supplements are added to the feed, involves separating the zooplankton culture from the water in which it is cultured in and processing the zooplankton further. Daphnia may be skimmed directly from the food processing culture tank 410. Zooplankton may be flowed with water and remaining algae from the food processing culture tank 410, collected with a screen of sufficiently small pore size to capture most or all Daphnia. Daphnia may then be transferred from this screen by hand, water jet, squeegee, or other method and optionally transported by conveyor belt or other method to the food processing subsystem 460. The screen itself may be transferred to the food processing subsystem 460 mechanically or manually. In this example, adult daphnia may provide a sufficiently large food particle to support goldfish growth, but this method may be employed if managers choose to increase food conversion ratios or growth rates by offering goldfish larger-sized feed pellets or nutritionally-enhanced pellets. However, since the nutritional attributes of daphnia correspond well to the dietary needs of goldfish, this method may not be necessary in this example. In this case, the option of separating daphnia from culture water previously described may not be necessary.

Other methods exist for segregating Daphnia by size within the food production culture tank 410. A screen, jointed in the middle, may be inserted in the center of the culture tank so that the two halves of the screen, each equal to the radius of the culture tank are folded and touching. Topically, this might resemble two hands of a clock at 12 and 1 o'clock. The "1 o'clock" hand may be moved clockwise around the tank, allowing smaller daphnia to pass through, corralling larger daphnia between 11 o'clock and 12 o'clock, and might be removed from the system by a drain located between 11 and 12 o'clock. Light sources may be used to attract small and large daphnia at 5:30 and 11:30 respectively before removing larger daphnia from the culture tank.

A screen of sufficient-sized pores to trap adult daphnia and not juvenile daphnia may normally rest on the bottom of the culture environment, raised slowly to harvest adult daphnia, and returned to the bottom until the remaining Daphnia mature. Managers may find maintaining Daphnia of a variety of ages and sizes in a culture tank enhances growth rates, but because reproduction and growth are continuous and rapid, this may not be necessary for Daphnia, but could be taken into consideration for other food production species.

The previous harvesting methods may be employed within the system described in this example, and similar modifications may be made that do not differ substantially from the purpose and scope of the harvesting concept.

An additional benefit of extracting zooplankton species from their culture water before processing into feed is the ability to prevent water that contains parasites or is of suboptimal water quality from entering the production culture environment.

In an implementation of the invention, the food processing subsystem 460 collects zooplankton and/or phytoplankton, non-planktonic feed sources such as filamentous algae, duckweed or other floating plants, zebra mussels, and any other live feed species capable of growth within the system through photosynthetic growth, chemosynthetic growth, or feeding on other system organisms. Different production species possess different nutritional requirements, and different species cultured as sources of food are chosen based on their ability to meet these requirements and utilize nutrients within the system.

The method for refining food species into food for production species may involve forming a slurry from whole organisms, reducing water content, forming into pellets, drying through exposure to air and/or heat, and collecting for storage or transportation directly to the production subsystem 20. Pellets may be in the form of flakes. Alternatively, refining of food species can result in a paste. Managers may choose to include such nutritional supplements as amino acids, lipids, carbohydrates, vitamins, minerals, or other additives. These supplements may be added to the slurry.

A variety of other methods and devices may be employed to transform live feed into larger particles. Managers may decide upon these methods based on production requirements, size of facility, cost, desired level of control over food quality, storability of food produced, and other factors. There should be no limitation on the actual selection of method and device that would depart from the invention. The invention can extract live food from the culture tank and further process it into another form for feeding to be used elsewhere in the system as a food input for production species or other use.

Finally, some food species cultured may be of sufficient size for direct feeding into the production subsystem 20. These might include larger copepods, other crustaceans resembling natural food size, or baitfish. These live foods may still be removed from the system in which they are raised in order to be fed to production culture tanks 210 in metered amounts and frequencies.

Figure 5:
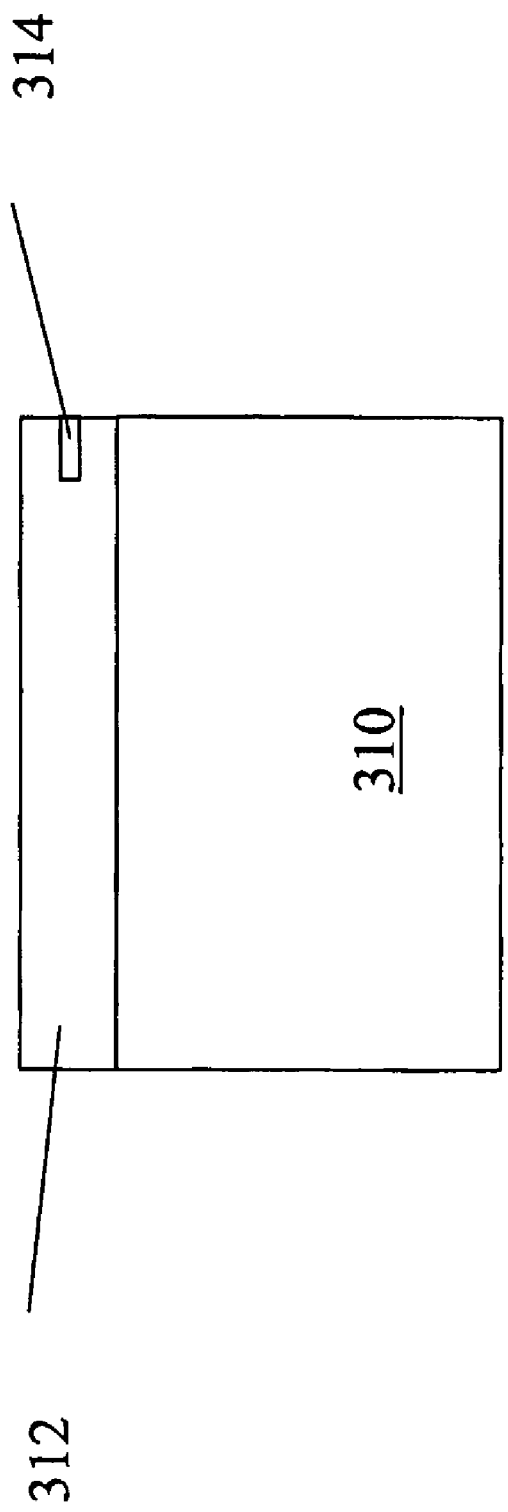
FIG. 5 provides an illustration of a photosynthetic culture tank having a cover according to an embodiment of the invention.

With reference to FIG. 5, a photosynthetic culture tank 310 is illustrated having a cover 312 according to an embodiment of the invention. A sensor 314 is also provided to sense the gas above the water in the photosynthetic culture tank 310.

The invention could be designed to function outdoors with no tank covers or greenhouses or indoors with no exposure to natural light. The use of a device or structure that enables the control of temperature, gas concentrations in and around tanks, and light to reach the tanks is highly desirable. Placing tanks in greenhouses or installing transparent covers that allow light to enter photosynthetic and in some cases food production and production systems enhances the growth of the cultured species. Light is essential for the growth of photosynthesizers. Artificial light may be used in indoor facilities, but at additional expense.

Controlling temperature allows facilities to be built in a range of climates in which the species cultured would not thrive. Further, temperature control enables year-round growth, and therefore harvest whenever desirable. Finally, the ability to control temperature aids in the control of growth and development. In the case of culturing sturgeon for caviar, fish will want to be grown in warm water for faster growth, but for a period before sexual maturity cultured in cold water to increase egg production. Many fish become seasonally sexually active from temperature change, among other factors. Temperature can be manipulated throughout the year to produce eggs from broodstock. Crustacean molting may be induced. Managers are able to slow or accelerate growth when desired.

Tanks that are covered in some way, preferably with a greenhouse, then have a specific space around them. The gas within that space may be monitored and controlled, which in turn will effect dissolved gas levels in culture tanks as gases dissolve. Dissolved gas levels in tanks reaches an equilibrium with the gas in the atmosphere around those tanks. This invention seeks to optimize dissolved gas levels in production, photosynthetic, and food production subsystems. One method, passing air through the water and atmosphere in production and zooplankton subsystems will equilibrate the water in those systems with the air that flows through them. This may occur in a variety of ways, the simplest being a bio-filter chamber filled with substrate already used for bio-filtration that culture water splashes through but does not fill, to which are attached inflow and outflow lines for airflow. The levels of all gases dissolved in the culture water will approach the levels in the air that flows through the gas stripping device. Because that gas then holds a greater concentration of those chemicals beneficial to photosynthesizers, it then enters the chamber in which photosynthetic tanks are. Preferably, the gas that passed through the production or zooplankton tanks enriched with carbon dioxide and nitrate is pumped into phytoplankton or plant tanks. Some of this gas will be immediately dissolved into the photosynthetic culture water, but much will enter the atmosphere around the tanks. Over time, the photosynthetic tanks will have elevated levels of carbon dioxide, nitrate, phosphorous, and other chemicals commonly produced in the production of animals through their respiration and metabolic cycles on which photosynthesizers depend for growth.

By covering tanks, regulating temperature, filtering and treating water within and between subsystems the invention creates different water chemistry and climates optimized for the growth of the particular culture species in production, photosynthetic, and food production subsystems. The same methods and devices along with others could be applied to scavenging subsystems, and may be useful for wastewater and solid waste treatment. The presence or absence of light, lux control, temperature control, and specific gas levels will vary by culture species.

The water storage device 50 may be used to store water collected from an exterior source such as, for example, a well, body of water, or river. The system may store water for treatment and/or release into culture tanks, food production, or wastewater or any other system. Treatment of water might include oxygenating, adjusting temperature, controlling salinity, as well as adjusting hardness. Different water systems may be used for different species based on the levels that maximize growth and/or health or other desired characteristics. Alternative storage tanks housing salts, heaters, or chillers may be attached to this system to adjust salinity or temperature.

The harvesting subsystem 60 may be used to harvest fish or aquatic products from production tanks, pack with ice, clean and fillet or otherwise process for shipping and transform into a form consumers or wholesaler distributors desire. This system might connect to shipping bays and include refrigeration, freezing, employees or machines for cleaning, cutting, and packaging aquatic products.

The scavenger culture 70 may be included to consume solid waste from passed feed, dead fish, processed fish, plants, algae, zooplankton, and any other physical matter in the system alive or dead with nutritional value to a scavenger species. Most commonly, this would consist of water in tanks from the food production subsystem or water storage. These tanks could contain lobsters, crabs, crayfish, snails, fish or other commercially valuable species. However, those skilled in the art could craft a system around non-crustaceans. Further, this system could contain organisms capable of processing those physical wastes but with no significant value as commodities for sale. These might include species of snails, zebra mussels, grass carp.

The scavenger culture 70 could also be replaced with an evaporation or settling pond where physical, gaseous, or liquid waste products are converted into useful forms for re-use in the facility or removal. In this case plants or algae may be cultured in tanks or evaporation ponds. In this case plants may be a sellable commodity or simply a means of filtration. However, sea urchins, snails, crayfish or a variety of other scavenging and grazing organisms may be cultured in combination with these plants simply for waste consumption or sellable commodity production.

The scavenger culture 70 may be the end of the water cycle for the farm. In this case water either evaporates from settling or evaporation ponds and this system would act as a means of holding water that cannot be suitably cleaned to re-circulate through the farm. However, this system could be designed to clean water and return it to production or other subsystems. In many cases, many types of bacteria and micro-organisms may be added or allowed to grow naturally to enhance the effects of water treatment and scavenger production. The design of such a system would vary based on its objective: water treatment for return to the facility, water evaporation, preparation of solid waste to later seed photosynthetic and food production systems, preparation of solid waste to remove from the facility, production of those plants, animals, and algae that thrive in these environments for sale.

While this system can be designed for all or any one of these objectives, the presence of a scavenger culture 70 that produces such commercially valuable product species as American lobster or Blue Crabs converts the expense of storage and removal of unusable fish carcasses and dead fish into the basis for revenue. Further, by processing scavenger food prior to addition to tanks, farms can produce additional products for sale that have optimal diets derived from organisms in production and other subsystems that may be enhanced with supplements. Feeding harvested fish parts from production systems or unharvested dead fish may provide a cleaner diet than scavengers encounter in the wild for nutritional improvements for the humans to which these scavengers are sold for consumption. The use of greenhouse covers allows managers to harvest these species year-round and, in the case of such scavenger species as Blue Crabs, control the molting process, thereby selling them as soft-shell crabs and further enhancing their value.

The design of the optional broodstock subsystem 80 may resemble the production subsystem 20 in the form of tanks, filtration and feeding methods. However, broodstock are cultured for health, not growth, and for reproductive fecundity. Therefore, much benefit may be derived from the addition of live feed and optimal water conditions. This system can also provide habitats for breeding, stripping milt and eggs, or egg and fry rearing. The goal is to generate larva or juvenile production species for stocking in the production subsystem 20.

In the case of an embodiment of the invention, a cluster may consist of a culture tank, biofilter, mechanical filter, gas and water chemistry probes, and all pipe fittings and attachments. Water continuously recirculates within a cluster, and is released to the next system when water is needed in the next system, or chemicals (carbon dioxide, nitrogenous wastes, phosphorous wastes) reach a level determined by managers. The shapes of tanks could be circular, raceway, D-shape, or loops.

In the case of an embodiment of the invention, a grid system may be used to facilitate re-allocation of resources around a farm to meet demand fluctuation. This increases the opportunity for just-in-time harvest and builds supply chain flexibility into production systems. For example, the production subsystem may allot 100 clusters to sturgeon production, and 100 to trout production. More or less clusters may be devoted to the production of either species based on demand because these clusters are relatively generic. Further, the number of phytoplankton and zooplankton modules used for each task may fluctuate based on capacity targets, fluctuation in system parameters, seasonal demand or any other reason.

In a further embodiment, a channel system is provided for connecting tanks or clusters with channels to make it easier to move fish between tanks. This optional system reduces fish loss and labor cost. When water transfers between subsystems, or production specie are graded or for any other reason moved to different tanks or clusters, they may enter a channel system. Rather than use a Pescalator which involves labor cost and stress to fish, managers may open channel gates and transfer and grade fish in a fixed or moveable pipe.

The single-species freshwater system described above separates and stores a variety of inputs at different stages of production. These inputs may be stored in excess of the needs for one system. Further, the process of separating these inputs from the culture environment requires a capital investment in plant, equipment, and the hiring of specialized labor. As output is expanded through larger plant designs, the cost per additional unit of output declines. Therefore, economies of scale and scope may be achieved by producing on a larger and broader scale. Additionally, because the system extracts specialized inputs, much benefit may be derived by expanding the production facility to produce a variety of species that may benefit from these inputs, and operate at a sufficiently high level of output to cover the fixed costs associated with extracting them, as well as the opportunity cost associated with purchasing these variable inputs from specialized distributors. The simple freshwater system previously described may be environmentally and energetically efficient, but may not produce fish at a profitable level on a small scale.

The costs associated with expanding the photosynthetic and food production subsystems 30, 40 decline on a per unit basis at higher levels of capacity. This is because the cost of physical and human capital needed to culture these organisms declines at a marginal rate as output expands. Additionally, finfish are tertiary feeders, requiring feed sources that are higher on the food chain than the food that filter feeders like mollusks require. Therefore, since the system already produces inputs such as planktonic algae, adding a mollusk culture system onto the phytoplankton subsystem may capitalize on the availability of inputs.

Fish raised in farms frequently die. Some farms save these fish in storage tanks and either sell, donate, or pay to have them removed, eventually being employed as fertilizer or destroyed. Since deceased fish are the natural food source of other commercially desirable final products, it may be logical to add production systems that rely on perished fish as a source of feed, as discussed above in relation to the scavenger culture 70. For example, crab and crayfish cultures may be incorporated in this way. This combination of cultures reduces the need to remove dead fish from the facility and import additional food for scavengers.

Nori seaweed used for sushi wrappers, *Ascophyllum nodosum* and kelps for carrageenan and other emulsifiers, and diatoms used as polishers may be cultured in systems analogous to the phytoplankton subsystem. While this algae is benthic (attaches to a substrate) and the diatoms are planktonic, this system would fit into the facility in a similar position as phytoplankton cultured as a source of food, elsewhere. Further, ornamental plants may be cultured for sale in an analogous position to photosynthetic or phytoplankton subsystem tanks.

Different culture species have different environmental and nutritional requirements. Therefore, a farm rearing single or multiple species may maintain relatively consistent water conditions across production, phytoplankton, and zooplankton subsystems. Consistent conditions may be a range of temperature, salinity, or water chemistry. While it may be possible to maintain significantly different environments among subsystems within the same facility, it may be more cost effective to select species that require similar environments in order to reduce the costs associated with replicating those natural conditions. Therefore, species preferring similar temperature and salinity may be grouped together. Phytoplankton, zooplankton, and micro-cultures may be matched by environmental and nutritional requirements/characteristics, and taste of the final product species. For example, should a facility raise salmon as its final product, the farmer might cultivate *Dunaliella* and *Rhodomonas* algae, *Tisbe japonicus* copepods, and rotifers for the phytoplankton, zooplankton, and biofilters, respectively. Lobsters may be cultivated as a scavenger crustacean, and oysters as a mollusk. When selecting a scavenger crustacean, the managers may want to weigh the costs of including that system compared with those for storing and disposing of dead salmon. Even if lobsters are slow to reach market size, the benefits of cultivating them may outweigh the costs of mort storage and disposal, as well as foregone revenue.

The form of additional systems may resemble the production subsystem 20, photosynthetic subsystem 30, or the food production subsystem 40. Modifications may need to be made to fit the systems to different phyla. For example, mussels as a source of food or final product will need a substrate to attach themselves to. Therefore, it may be desirable to submerge a porous grid which maximizes the surface area of this substrate in the culture medium. Oysters and clams are frequently cultured in mesh bags to allow for water flow and provide ease of handling.

A variety of food species exist with which to feed final product species. *Daphnia, moina,* copepods, rotifers, baitfish, and zebra mussels are some examples based on growth rates, ease of cultivation, and nutritional value. The goal may be to shorten the food chain to concentrate nutrients per mass and reduce culture costs. Some of these inputs, like zebra mussels, may be useful to organisms that prefer feeding on mollusks, like striped bass, but may need to be refined for other final product species by pulverizing shells. Further, culturing mussels as a feed input may require calcium carbonate supplements to promote shell growth. Systems should be designed so that spat from mussels does not colonize other unwanted areas of the facility. The food and wastewater organisms that may best match combinations of product species and the required environmental conditions are listed below.

Haddock, flounder, halibut, salmon lobster, dungeness crab, oyster could use *tigriopus japonicus* (calanoid), *brachionus plicatilis* (rotifer) *chlorella*, yeast. Striped bass, snapper, sea bass, blue crab, soft shell oyster could use *tisbe holothuriae dunaliella, Rhodomonas*. Ornamental tropicals, crustaceans, sponges, urchins, could use *daphnia, moina, chlorella, chalmydomas.*

It is understood that many of the methods or apparatus of the embodiments of the present invention may be used for producing caviar by harvesting caviar from fish raised in the production culture subsystem. Caviar may be the pre-fertilized eggs of sturgeon, other fish and shellfish species, or may be replaced with the culture of roe, post-fertilized eggs of any fish or shellfish species.

The present invention has been described by way of example, and modifications and variations of the exemplary embodiments will suggest themselves to skilled artisans in this field without departing from the spirit of the invention. Features and characteristics of the above-described embodiments may be used in combination. The preferred embodiments are merely illustrative and should not be considered restrictive in any way. The scope of the invention is to be measured by the appended claims, rather than the preceding description, and all variations and equivalents that fall within the range of the claims are intended to be embraced therein.

Having described the invention, what is claimed as new and protected by Letters Patent is:

1. A method of aquaculture, comprising:
   growing a photosynthetic first species in a first tank, water in the first tank having a first water chemistry;
   providing the first species to a second species in a second tank that eats the first species, water in the second tank having a second water chemistry different from the first water chemistry;
   providing the second species to a fish in a third tank; and
   wherein the second water chemistry has less nitrogenous waste and carbon dioxide than the first water chemistry.

2. The method of claim 1, wherein water in the third tank has a third water chemistry, different from both the first water chemistry and the second water chemistry.

3. The method of claim 1, wherein the first species is not provided to the fish.

4. The method of claim 1, further comprising the act of circulating water from the first tank to a filter dedicated to the first tank and back into the first tank.

5. The method of claim 4, further comprising the act of circulating water from the second tank to a filter dedicated to the second tank and back into the second tank.

6. The method of claim 5, further comprising the act of circulating water from the third tank to a filter dedicated to the third tank and back into the third tank.

7. The method of claim 1, further comprising the act of providing a water storage device coupled to the first tank, the second tank and the third tank.

8. The method of claim 1, further comprising the act of activating a water transfer device to enable transfer of water between the third tank and the first tank.

9. The method of claim 8, wherein the act of activating is triggered by a nitrogen compound level of the water in the third tank.

10. The method of claim 8, wherein the act of activating is triggered by a nitrogen compound level of the water in the first tank.

11. The method of claim 8, wherein the act of activating is triggered by a water quantity in the first tank.

12. The method of claim 1, wherein the first species is a non-floating plant.

13. The method of claim 1, wherein the fish is a sturgeon.

14. The method of claim 1, wherein a ratio of volumes of water in the third tank and in the first tank is 2:1.

15. A method of aquaculture, comprising:
    growing a photosynthetic first species in a first tank, water in the first tank having a first water chemistry;
    providing the first species to a second species in a second tank that eats the first species, water in the second tank having a second water chemistry different from the first water chemistry;
    providing the second species to a fish in a third tank; and
    wherein the first species is phytoplankton and the second species is zooplankton.

16. The method of claim 15, wherein water in the third tank has a third water chemistry, different from both the first water chemistry and the second water chemistry.

17. The method of claim 15, wherein the first species is not provided to the fish.

18. A method of aquaculture, comprising:
    growing a photosynthetic first species in a first tank, water in the first tank having a first water chemistry;
    providing the first species to a second species in a second tank that eats the first species, water in the second tank having a second water chemistry different from the first water chemistry;
    providing the second species to a fish in a third tank; and
    stripping carbon dioxide from the water in the third tank and supplying the carbon dioxide to water in the first tank.

19. The method of claim 18, wherein water in the third tank has a third water chemistry, different from both the first water chemistry and the second water chemistry.

20. The method of claim 18, wherein the first species is not provided to the fish.

* * * * *